United States Patent Office 3,507,721
Patented Apr. 21, 1970

3,507,721
CROSSLINKED CARBOXY-TERMINATED POLY-
ETHER PROPELLANT COMPOSITIONS CON-
TAINING NITRATO ESTERS
Toshio W. Nakagawa, San Jose, and Thomas P. Rudy,
Saratoga, Calif., assignors to United Aircraft Corpora-
tion, East Hartford, Conn., a corporation of Delaware
No Drawing. Filed Aug. 1, 1967, Ser. No. 657,521
Int. Cl. C06d 5/00, 5/06
U.S. Cl. 149—19                          3 Claims

ABSTRACT OF THE DISCLOSURE

Carboxy-terminated polyethers having the general structural formula:

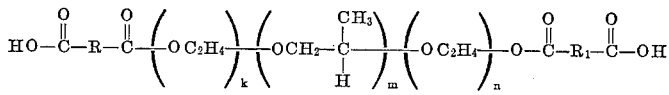

wherein R and $R_1$ are hydrocarbyl groups containing 2–4 carbon atoms, $k$ and $n$ are integers whose sum is not less than 4 nor more than 60, $m$ is an integer not less than 6 nor more than 70 and the value of the relationship $k+n/k+m+n$ is not less than 0.2 nor more than 0.6. Such polymers are compatible with the nitrato esters used in high burning rate propellants, high density propellants and metal hydride containing propellants and can be crosslinked with a crosslinking agent having a functionality greater than 2 to produce nitrato ester plasticized propellants having good mechanical properties.

BACKGROUND OF THE INVENTION

High burning rate and high density composite propellants incorporating high energy nitrato ester plasticizers have been prepared in which crosslinked carboxy-terminated polyesters are employed as the binder. These propellants have not been found to be completely satisfactory because the high plasticizer content detrimentally affects the mechanical properties of the propellant and the uncured propellant mix is too viscous to permit processing at the high solids loadings which are needed to obtain high impulse propellants. According to this invention a novel class of prepolymers has been developed which exhibit excellent solvency for the nitrato ester plasticizers, have relatively low viscosities with high solids loadings and can be crosslinked to produce propellant compositions having good mechanical properties.

It is accordingly an object of this invention to provide a novel carboxy-terminated difunctional prepolymer.

It is another object of this invention to provide a prepolymer that is compatible with nitrato ester plasticizers.

It is another object of this invention to provide a high burning rate composite solid propellant plasticized with nitrato esters.

It is another object of this invention to provide a prepolymer having relatively low viscosity at high solids loadings.

It is another object of this invention to provide a nitrato ester plasticized composite solid propellant having good mechanical prperties.

These and other objects of this invention will be readily apparent from the following description of the invention.

DESCRIPTION OF THE INVENTION

In accordance with the above objects useful prepolymers according to this invention are carboxy-terminated polyethers having the following structural formula:

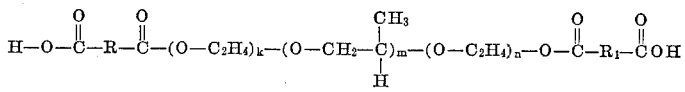

wherein R and $R_1$ are hydrocarbyl groups containing 2 to 4 carbon atoms, $k$ and $n$ are integers whose sum is not less than 4 nor more than 60, $m$ is an integer not less than 6 nor more than 70 and the relationship $k+n/k+m+n$ has a value of not less than 0.2 nor more than 0.6.

It is important to have the oxyethylene groups and oxypropylene groups arranged as block polymers as shown since it has been observed that heteric polymers have substantially the same ratio of oxypropylene and oxyethylene groups do not exhibit good solvency for nitrato esters. Also, the proportion of oxyethylene and oxypropylene be selected as shown, since too great an oxyethylene content raises the glass temperature to undesirable levels thereby detrimentally affecting physical properties of a propellant at low temperatures, and too great an oxypropylene content causes reduced solvency for the nitrato ester plasticizer. The total molecular weight of the prepolymers according to the above relationship ranges from about 1000 to about 5400, yields materials having processable viscosities and produces cured propellants with good mechanical properties. If the cured propellant is desired to have high elongation, a high molecular weight prepolymer is used and if high tensile strength is required the low molecular weight prepolymer is used.

The prepolymers according to this invention are readily synthesized from commercially available materials. One basic approach is an acid-catalyzed esterification of a dicarboxylic acid anhydride having from 4 to 6 carbon atoms with a polyether having hydroxyl functionality of 2.0 according to the following reaction:

TABLE I

| Sample | $k+n$ | $m$ | Eq. Wt., g./$CO_2H$ | Mol. Wt (1) | Gel time/ hour (2) |
|---|---|---|---|---|---|
| 1 | 22 | 16 | 961 | 2,250 | 1.6 |
| 2 | 11 | 21 | 1,007 | 2,005 | 1.9 |
| 3 | 18 | 21 | 1,229 | 2,200 | 2.9 |
| 4 | 26 | 30 | 1,386 | 2,710 | 2.5 |

1 Number average molecular weight determined by vapor phase osmometry.
2 Gel time measured by Sunshine gel timer at 90° C. Formulation consists of tris[1-(2-methylaziridinyl)] phosphine oxide (MAPO) and polymer; equivalence ratio, aziridine/carboxyl=1.3/1.0.

The polymers according to this invention can be cured with a variety of crosslinking agents having a functionality greater than 2. A large number of suitable crosslinking agents are known to the art and include, while not being limited to, MAPO; tris-(1-aziridinyl)-s-triazine; tris-(1-aziridinyl)phosphine oxide; tris-(2-ethylaziridinylmethyl) cymel; tris-[1-(2-ethyl)aziridinyl]-s-triazine; tris-[1-(2-methyl)aziridinyl]-s-triazine; 2,2′,2″-nitrilotriethyl-β-[1-(2-methyl)aziridinyl]butyrate; 2,2′,2″-nitrilotriethyl-β-[1-(2-methyl)aziridinyl]propionate; tris-1,3,5-[1-(2-methyl)

$$H-(OC_2H_4)_k-(OCH_2-\underset{H}{\underset{|}{C}}-)_m-(OC_2-H_4)_n-OH + 2 \quad \underset{O}{\overset{CH_2-CH_2}{\underset{\diagdown O \diagup}{C \quad C}}} \overset{p\text{-toluenesulfonic acid}}{\longrightarrow}$$

$$HO-\overset{O}{\overset{\|}{C}}-CH_2-CH_2-\overset{O}{\overset{\|}{C}}-(OC_2H_4)_k-(OCH_2-\underset{H}{\underset{|}{\overset{CH_3}{C}}}-)_m-(OC_2H_4)_n-O-\overset{O}{\overset{\|}{C}}-CH_2-CH_2\overset{O}{\overset{\|}{C}}=OH \longleftarrow$$

The values of $k$, $m$ and $n$ in the hydroxy-terminated polyether will be the same as desired in the end product, and such polyethers are commercially available in almost any desired combination.

Example 1

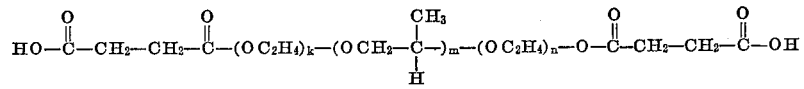

The following specific procedure is illustrative of the acid-catalyzed synthesis of the polymers of this invention. A hydroxy-terminated block polyether having the desired arrangement of oxyethylene and oxypropylene groups is employed as the starting material. In this case 290 gm. of Wyandott Pluronic L64 (eq. wt. 1450), 100 gm. succinic anhydride, 3.9 gm. of p-toluenesulfonic acid and 150 gm. of the anhydrous inert solvent, dioxane, were placed in a one liter, three-necked, round bottom flask fitted with a stirrer, nitrogen gas inlet and a reflux condenser having a drying tube to exclude atmospheric moisture. A small flow of nitrogen was used to maintain an inert atmosphere during synthesis. The reactants were stirred and maintained at 100° C. for four hours and then transferred to a 500 ml. wide mouth Erlenmeyer flask which was covered and allowed to cool to room temperature. Unreacted succinic anhydride precipitated from solution. Approximately 150 ml. of benzene was added to the mixture and the precipitated anhydride was removed by filtration through a Buchner funnel. The filter cake was washed with about 50 ml. of benzene and the filtrate was stripped of solvent at 70° C. in a rotary vacuum evaporator. Final purification of the product was accomplished by removal of volatile constituents in a wiped film molecular still at a pressure of 0.02–0.03 torr and a wall temperature of 125° C.

Properties of polymers produced according to this process are shown in Table 1.

aziridinylpropionyl]-hexahydro - s - triazine; tris-1 - (2-methyl)aziridinyl phosphine sulfide; 1,2,3-tris-(2,3-epoxypropoxy)propane; 1,1,3-tris-[4-(2,3-epoxypropoxyphenyl)]propane; N,N-bis-(2,3-epoxypropyl)-4-(2,3-epoxypropoxy)aniline; 1-(2,3-epoxypropoxy)-2,6-bis-(2,3-epoxypropyl)benzene and triglycidyl ether of 1,2,3-trimethylolpropane.

The polymers of this invention are extremely useful in the preparation of nitrato ester plasticized propellants. Suitable high energy nitrato esters are known to the art and include, while not being limited to, trimethylolethane trinitrate; triethyleneglycol dinitrate; 1,2,4-butanetriol trinitrate; 1,4-butanediol dinitrate; diethyleneglycol dinitrate; pentaerythritol trinitrate; glycerol trinitrate and polyglycidyl nitrate. The polymers of this invention exhibit excellent solvency for such nitrato esters and can be used to produce high energy binders which employ as high as 75% by weight of the ester.

In addition to the nitrato esters, the propellants can contain solid inorganic oxidizing salts such as ammonium perchlorate, ammonium nitrate, alkali metal nitrates and perchlorates; solid fuel materials such as metals, metal hydrides, boron, boron hydrides, and ballistic modifiers such as iron oxide, chromic oxide and ferrocene as is known to the art.

Example 2

A carboxy-terminated polyether according to this invention having the formula of Example 1 with $k+n$ equal to about 22 and $m$ equal to about 16 and having a molecular weight of about 1935 was compared with a prior art carboxy-terminated polyester having a molecular weight of about 2000 from the standpoint of viscosity and easy of processing. The viscosity was measured at 24° C.

The polymer of this invention exhibited a viscosity of 1900 c.p.s. whereas the polyester exhibited a viscosity of 22,400 c.p.s. It is readily apparent that the lower viscosity of the polymer according to this invention will result in greatly improved processing characteristics.

Example 3

Propellant grains weighing about 30 gm. were cast and cured in the form of internal burning cylinders 2″ in length, 0.70″ O.D. and 0.3″ I.D. from the compositions of Samples 8 and 9.

Micromotor firings of these grains at various chamber pressures produced the results shown in Table II.

TABLE II

| Composition of sample— | Average chamber pressure (p.s.i.a.) | Burning rate, in./sec. |
|---|---|---|
| 8 | 540 | 0.44 |
| 8 | 1,050 | 0.55 |
| 8 | 1,950 | 0.69 |
| 9 | 580 | 0.46 |
| 9 | 1,000 | 0.53 |
| 9 | 2,000 | 0.73 |

Example 4

Carboxy-terminated polyethers having the general structural formulas of Example 1 were formulated into propellants having the compositions and mechanical properties of Table III.

While this invention has been described with respect to various embodiments thereof, it should not be construed as limited thereto. Various modifications will be apparent to workers skilled in the art and can be made without departing from the scope of this invention which is limited only by the following claims.

We claim:
1. A curable composition useful in the preparation of nitrato ester plasticized solid propellants comprising a carboxy-terminated polyether block polymer having the structural formula:

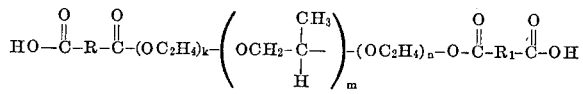

wherein R and $R_1$ are hydrocarbyl groups having from 2 to 4 carbon atoms, $k$ and $n$ are integers whose sum is not less than 4 nor more than 60, $m$ is an integer not less than 6 nor more than 70 and the value of the relationship $k+n/k+m+n$ is not less than 0.2 nor more than 0.6 having liquid nitrato ester dissolved therein.

2. The composition of claim 1 further comprising a crosslinking agent for the compound of claim 1, said crosslinking agent having a functionality greater than 2.

3. The composition of claim 2 further comprising an inorganic oxidizing agent dispersed therethrough.

TABLE III

| Ingredients | Sample 3 | 4 | 5 | 6 | 7 | 8 | 9 |
|---|---|---|---|---|---|---|---|
| Carboxy-terminated polyether: | | | | | | | |
| $k+n$ | 22 | 11 | 11 | 18 | 18 | 26 | 26 |
| $m$ | 16 | 21 | 21 | 21 | 21 | 30 | 30 |
| Eq. wt. | 961 | 1007 | 947 | 961 | 1229 | 1493 | 1576 |
| Wt. percent | 9.89 | 7.01 | 6.92 | 6.94 | 7.27 | 7.51 | 7.56 |
| TBM:[1] | | | | | | | |
| Eq. wt. | 100 | 100 | 100 | 100 | 100 | 100 | 100 |
| Wt. percent | 1.54 | 1.04 | 1.10 | 1.08 | 0.89 | 0.75 | 0.72 |
| Epon 812:[2] | | | | | | | |
| Eq. wt. | 154 | 154 | 154 | 154 | 154 | 154 | 154 |
| Wt. percent | 1.07 | 0.75 | 0.78 | 0.78 | 0.64 | 0.54 | 0.52 |
| TMETN.[3] Wt. percent | 12.50 | 8.80 | 8.80 | 8.80 | 8.80 | 8.80 | 8.80 |
| Aluminum, 40 micron: Wt. percent | 21.00 | 16.00 | 16.00 | 16.00 | 16.00 | 16.00 | 16.00 |
| Ammonium Perchlorate: | | | | | | | |
| 190 micron, wt. percent | 32.40 | 46.48 | 46.48 | 46.48 | 46.48 | 46.48 | 46.48 |
| 12 micron, wt. percent | 21.60 | 19.92 | 19.92 | 19.92 | 19.92 | 19.92 | 19.92 |
| Mechanical properties at 77° F. after cure:[4] | | | | | | | |
| Stress, max. p.s.i. | 99 | 90 | 154 | 148 | 89 | 75 | 53 |
| Elongation at max. stress percent | 29 | 22 | 15 | 19 | 27 | 41 | 53 |

[1] Tris (butylenimino)melamine.
[2] An aliphatic polyfunctional epoxide manufactured by Shell Chemical Company.
[3] Trimethylolethane trinitrate.
[4] Cured for 5 days at 120° F.

References Cited

UNITED STATES PATENTS

| 3,029,216 | 4/1962 | Bailey et al. | 260—823 |
| 3,050,423 | 8/1962 | Hudson | 149—19 |
| 3,130,096 | 4/1964 | Pruitt et al. | 149—19 |
| 3,177,190 | 4/1965 | Hsieh | 260—94.2 |
| 3,278,352 | 10/1966 | Erickson | 149—19 |
| 3,305,523 | 2/1967 | Burnside | 260—46.5 |
| 3,344,003 | 9/1967 | Miranda et al. | 149—19 |

BENJAMIN R. PADGETT, Primary Examiner

U.S. Cl. X.R.
149—88, 89, 93, 101